United States Patent [19]
Rohrbaugh et al.

[11] Patent Number: 5,512,805
[45] Date of Patent: Apr. 30, 1996

[54] METHOD AND APPARATUS FOR DETERMINING REVERSE ROTATION OF A POLYPHASE DC MOTOR

[75] Inventors: Mark E. Rohrbaugh; Francesco Carobolante, both of Phoenix, Ariz.

[73] Assignee: SGS-Thomson Microelectronics, Inc., Carrollton, Tex.

[21] Appl. No.: 218,466

[22] Filed: Mar. 28, 1994

Related U.S. Application Data

[63] Continuation of Ser. No. 843,821, Feb. 28, 1992, abandoned, which is a continuation-in-part of Ser. No. 770,577, Oct. 3, 1991, Pat. No. 5,306,988.

[51] Int. Cl.[6] .................................................. H02P 1/18
[52] U.S. Cl. ........................ 318/254; 318/138; 318/439
[58] Field of Search .................................. 388/809–815; 318/254, 138, 439

[56] References Cited

U.S. PATENT DOCUMENTS

| | | | |
|---|---|---|---|
| Re. 31,229 | 5/1983 | King | 318/254 X |
| 4,027,215 | 5/1977 | Knight et al. | 318/254 |
| 4,238,717 | 12/1980 | Knight et al. | 318/254 |
| 4,390,826 | 6/1983 | Erdman et al. | 318/439 |
| 4,492,903 | 1/1985 | Knight et al. | 318/254 X |
| 4,513,230 | 4/1985 | Erdman et al. | 318/254 |
| 4,556,827 | 12/1985 | Erdman et al. | 318/259 |
| 4,642,537 | 2/1987 | Young | 318/254 |
| 4,678,973 | 7/1987 | Elliott et al. | 318/254 |
| 4,743,815 | 5/1988 | Gee et al. | 318/254 |
| 4,752,724 | 6/1988 | Radziwill et al. | 318/254 |
| 4,857,814 | 8/1989 | Duncan | 318/281 |
| 5,017,853 | 5/1991 | Chmiel | 318/786 |
| 5,172,036 | 12/1992 | Cameron | 318/138 |

Primary Examiner—David S. Martin
Attorney, Agent, or Firm—Richard A. Bachand; Rodney M. Anderson; Lisa K. Jorgenson

[57] ABSTRACT

A circuit for operating a polyphase dc motor that has a plurality of driving coils has circuitry for receiving the back emf of at least one of the driving coils at a time when the at least one of the driving coils is in a floating state prior to the desired commutation sequence. Circuitry is provided for determining an anticipated direction the back emf will cross a reference voltage based upon the desired commutation sequence. And circuitry is also provided for determining if the back emf received by the circuitry for receiving the back emf crosses a reference voltage from other than the anticipated direction.

In addition, a method for operating a polyphase dc motor having a plurality of driving coils includes determining the actual instantaneous position of the rotor of the motor by determining when the back emf of at least one coil at a time when the at least one coil is in a floating state prior to the desired commutation sequence crosses a reference voltage from a predetermined direction. A desired rotor position precedent to executing a desired commutation sequence is determined, and the desired commutation sequence is executed when the circuit for determining the actual instantaneous position of the rotor detects that the rotor is actually in the desired rotor position. A signal is generated if the back emf of the at least one coil in a floating state crosses the reference voltage from other than the predetermined direction.

15 Claims, 2 Drawing Sheets

METHOD AND APPARATUS FOR DETERMINING REVERSE ROTATION OF A POLYPHASE DC MOTOR

CROSS-REFERENCES TO RELATED APPLICATIONS

This is continuation of application Ser. No. 07/843,821, filed Feb. 28, 1992, now abandoned, which is a continuation-in-part of our application Ser. No. 770,577, now U.S. Pat. No. 5,306,988, filed Oct. 3, 1991, entitled METHOD AND APPARATUS FOR OPERATING POLYPHASE DC MOTORS, said application being assigned to the assignee hereof and incorporated herein by reference in its entirety.

BACKGROUND OF THE INVENTION

1. Field of the Invention

This invention relates to improvements in circuitry for driving polyphase dc motors, and still more particularly to methods and apparatus for detecting reverse rotation of a rotor of a polyphase dc motor using information concerning the crossing of a reference voltage by the back emf of non-selected field coils.

2. Description of the Prior Art

Although the present invention pertains to polyphase dc motors, in general, it finds particular application in conjunction with three phase dc motors, particularly of the brushless, sensorless type that are used for rotating data media, such as found in computer related applications, including hard disk drives, CD ROM drives, floppy disks, VCRs, and the like. Such three phase brushless, sensorless dc motors are becoming more popular in computer applications due to their reliability, low weight, and accuracy.

Motors of this type can typically be thought of as having a stator with three coils connected in a "Y" configuration, although actually, a larger number of stator coils are usually employed with multiple motor poles. In such applications, the "Y" connected stator coils are typically connected in three sets of four coils, each physically separated by 90°, with eight pole rotors that have four electrical cycles per rotor revolution. In bipolar applications, the coils are energized in sequences. In each sequence, a current path is established through two coils of the "Y", with the third coil left floating. The sequences are designed so that as the current paths are changed, or commutated, one of the coils of the current path is switched to float, and the previously floating coil is switched into the current path. Moreover, the sequence is designed so that when the floating coil is switched into the current path, current will continue to flow in the same direction in the coil which was included in the prior current path. In this manner, six commutation sequences are defined for each electrical cycle of the three phase motor.

During the operation of such a motor, it has been recognized that maintaining a known position of the rotor is an important concern. There have been various ways by which this was implemented. The most widely used way, for example, was to start the motor in a known position, then develop information related to the instantaneous or current position of the rotor. One source of such instantaneous position information can be developed as a part of the commutation process by identifying the floating coil, and monitoring its back emf, that is, the emf induced into the coil as it moves through the magnetic field provided by the stator. When the voltage of the floating coil crosses zero (referred to in the art as "a zero crossing"), or a predetermined reference voltage, the position of the rotor can be determined. Upon the occurrence of this event, the rotor coil commutation sequence can be incremented to the next phase, and the process repeated. The assumption that the zero crossing accurately indicates the rotor position is generally true if the motor is functioning properly, and nothing has occurred which would disturb its synchronization from its known startup position. However, events may occur which nevertheless result in a loss of synchronization.

The possibility of loss of synchronization made the motors previously used vulnerable and delicate, and great care had to be taken to insure that the startup algorithms and running conditions were precisely controlled to avoid anything which might cause such out of synchronization condition to occur.

Moreover, one of the problems associated with such a motor is that generally after operation the position at which the rotor has stopped is not known, and to restart the motor by the application of startup voltage in a random fashion may tend to initially start the motor in the wrong direction. This can be a major problem in magnetic disk applications where backward rotation may damage the read/write heads.

SUMMARY OF THE INVENTION

In light of the above, therefore, it is an object of the invention to provide an improved apparatus and method for detecting reverse rotation of a polyphase dc motor.

It is another object of the invention to provide an improved apparatus and method of the type described which is useful in conjunction with three phase dc motors, particularly of the brushless, sensorless type which are used for rotating data media, such as found in computer related applications, including hard disk drives, CD ROM drives, floppy disks, and the like.

It is still another object of the invention to provide an improved apparatus and method of the type described that uses information concerning the voltage of the floating coils crossing a reference voltage, such as the zero crossing, in conjunction with information indicating the direction of the crossing to determine the direction of rotation of the rotor of the motor.

These and other objects, features and advantages of the invention will be apparent to those skilled in the art from the following detailed description of the invention, when read in conjunction with the accompanying drawings and appended claims.

In accordance with a broad aspect of the invention, a circuit for operating a polyphase dc motor having a plurality of driving coils is presented. The circuit includes circuitry for receiving the back emf of at least one of the driving coils at a time when the at least one of the driving coils is in a floating state prior to the desired commutation sequence. Circuitry is provided for determining an anticipated direction that the back emf will cross a reference voltage, based upon the desired commutation sequence. Circuitry is also provided for determining if the back emf received by the circuitry for receiving the back emf crosses a reference voltage from other than the anticipated direction.

In accordance with another broad aspect of the invention, a method for operating a polyphase dc motor having a plurality of driving coils is presented. In accordance with the method, the actual instantaneous position of the rotor of the motor is determined by determining when the back emf of the at least one coil in a floating state prior to the desired commutation sequence crosses a reference voltage from a predetermined direction. A desired rotor position precedent to executing a desired commutation sequence is determined, and the desired commutation sequence is executed when the circuit for determining the actual instantaneous position of the rotor detects that the rotor is actually in the desired rotor position. A signal is generated if the back emf of the at least one coil in a floating state crosses the reference voltage from other than the predetermined direction.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENT

Figure 1:
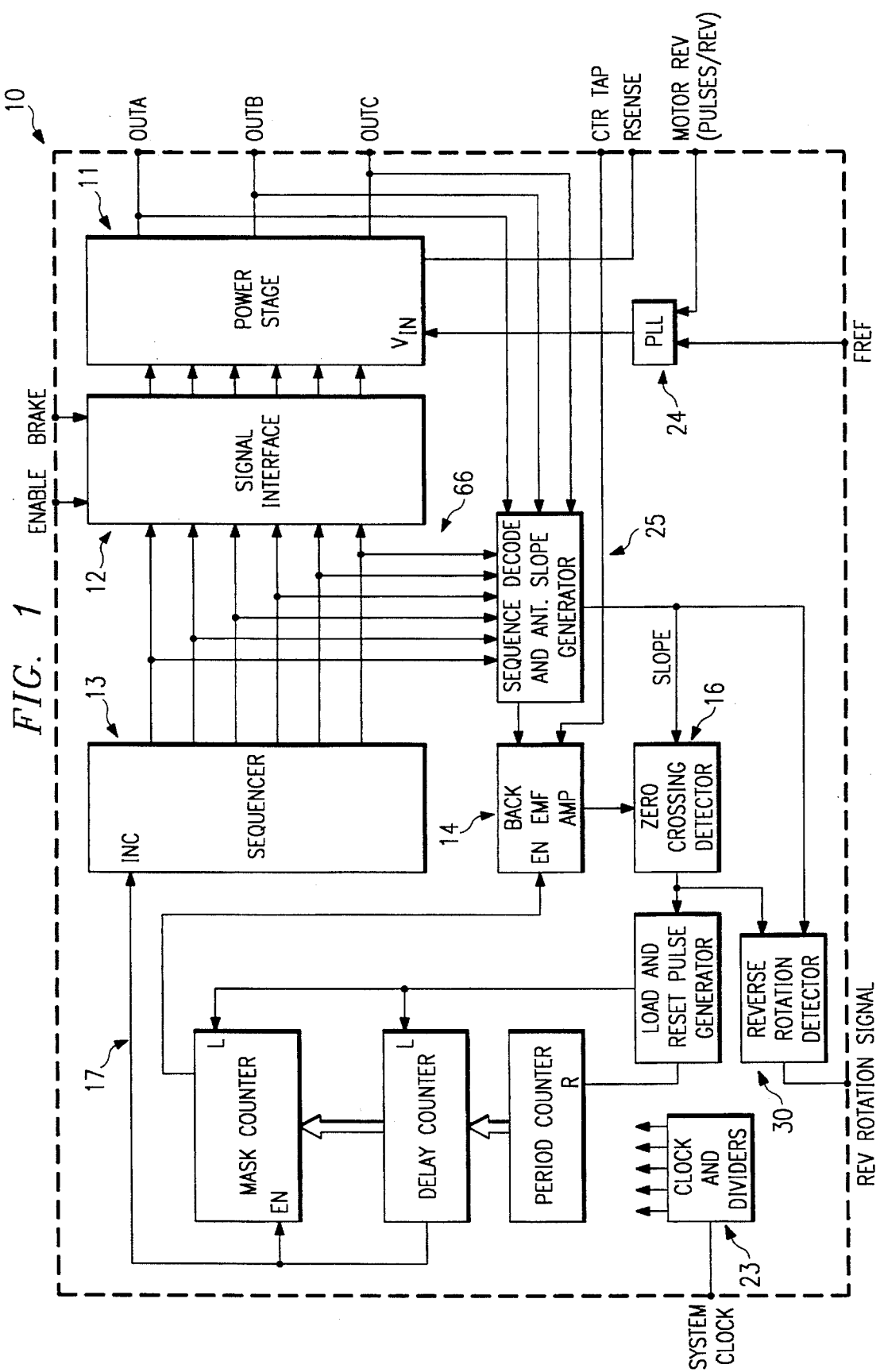
FIG. 1 is an electrical schematic block diagram of a motor driver system incorporating apparatus in accordance with a preferred embodiment of the invention.

A portion of an electrical schematic block diagram of a motor controller 10 in which the apparatus and method in accordance with a preferred embodiment of the invention may be incorporated is shown in FIG. 1. Although the motor controller can be constructed of discrete components, preferably, the motor controller 10 is integrated onto a single semiconductor chip adapted for connection to the stator coils of a three phase dc brushless spindle motor, for use, for example, to turn a magnetic or other disk in systems such as computer hard disk drives, cd-rom drives, floppy disk drives, VCRs, and the like. Such 3 phase motor preferably has Y connected stator windings, although such Y configured winding connections are not essentially required. Thus, the windings can be connected to output terminals OUT A, OUT B, OUT C and CTR TAP, as below described in further detail. It should be noted that although a preferred embodiment of the invention is described with regard to a three phase motor, in particular, the principles of the invention can be equally advantageously applied to polyphase motors, in general; also, it should be understood that the center tap connection may be simulated in some applications.

The driving voltage is provided to the output terminals OUT A, OUT B, and OUT C by a power stage 11 that provides sequential control output signals to the output terminals OUT A, OUT B, and OUT C by a sequencer circuit 13 via a signal interface circuit 12 that supplies the output signals from the sequencer circuit 13 to the power stage 11, as well as enabling other functions, such as dynamic brake and output enable functions. The sequencer 13 also provides drive signals to other circuits of the controller circuitry to control the various aspects of rotation of the motor driven by the circuit 10. The construction and operation of the power stage 11, the signal interface circuit 12, and the sequencer circuit 13, can be as described in the above referenced copending patent application Ser. No. 770,577.

The output terminals OUT A, OUT B, and OUT C are also switchably connected to a back-emf sense amplifier 14 that delivers signals to a reference voltage crossing detector circuit 16 that, in turn, provides input signals to a digital delay circuit 17. The output of the digital delay circuit 17 controls the operation of the sequencer 13, in a manner below described in detail. The motor controller circuitry 10 includes system clock circuitry 23, and phase lock loop (PLL) frequency/phase detector circuitry 24, and may include various other circuitry, not shown, such as circuitry to support pulse width modulation operation of the motor, start up circuitry to facilitate start up of the motor from a stopped condition, port control logic and associated shift register circuitry to facilitate control of the motor controller circuitry by an external microprocessor (not shown), and so forth. The construction and operation of the back-emf sense amplifier 14, the reference voltage crossing detector circuit 16, the digital delay circuit 17, and the other associated circuitry can also be as described in said above referenced copending patent application Ser. No. 770,577.

Circuitry 30 for detecting the reverse rotation of the rotor is connected to receive an output from the zero crossing detector 16, as well as information indicating the anticipated slope information from the sequence decoder. The slope information represents the anticipated direction from which the back emf of the floating coil will cross the reference voltage, or zero, for example, from positive to negative or from negative to positive. If the zero crossing detected occurs from an unexpected direction, an erroneous condition is detected that is indicative of a reverse rotation, and an output warning signal is supplied.

In operation of the circuit 10, the commutation among the field coils connected to OUT A, OUT B, and OUT C is performed in response to information indicating the specific position of the rotor of the motor in conjunction with circuit information indicating the desired position of the rotor. More specifically, the commutation to apply each successive sequence is determined in response to a corresponding coil reaching a particular rotational position and its correlation with sequencer information indicating where the motor should be at a particular time prior to when a commutation is to occur. The determination of the precise rotational location of the rotor is continuously being updated by monitoring the reference voltage crossing in each non-driven, or floating, coil. More particularly, as the signals delivered to OUT A, OUT B, and OUT C are switched during the commutation sequence of the rotor, the voltage of the floating coil is monitored by the back emf amplifier circuit 14.

The back emf amplifier circuit 14 includes switches connected to the motor driver outputs OUT A, OUT B, and OUT C to connect a selected one of the coils connected to the outputs OUT A, OUT B, or OUT C to the non-inverting input of a comparator. The particular one of the coils that is connected to the comparator corresponds to whichever of the coils is expected to be floating.

The center tap connection, or its equivalent, of the stator is connected to the inverting input of the comparator so that its output transition represents the reference voltage crossing (which may be a zero crossing) of the voltage on the selected floating coil. (The voltage which is applied to the input to the comparator is the so-called "back emf" of the coil, the voltage generated in the selected floating coil as it moves through the magnetic field within the motor.)

Figure 2:
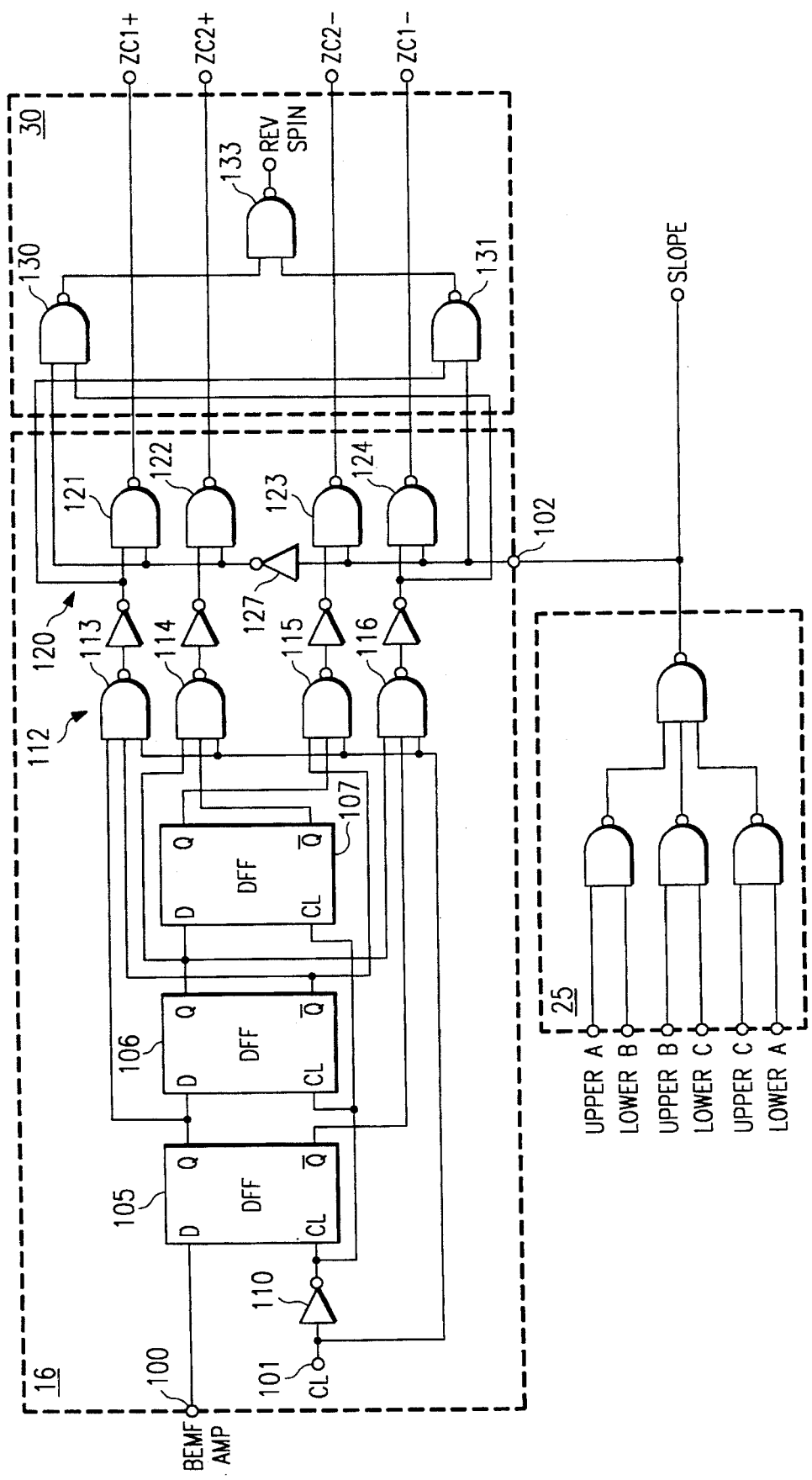
FIG. 2 is an electrical schematic diagram of circuitry used in conjunction with the system of FIG. 1 for detecting the direction of rotation of the rotor of the motor, in accordance with a preferred embodiment of the invention.

Circuitry of the reverse rotation detector 30 is shown in FIG. 2, in conjunction with the zero crossing detector circuitry 16 and a portion of the sequence decode and anticipated slope signal generator circuitry 25. The reverse rotation detector circuitry 30 receives its inputs from the outputs developed by the zero crossing detector circuitry 16 and from the slope detecting portion of the sequence decode circuitry and anticipated slope generator circuitry 25.

The zero crossing detector circuitry 16 receives an input on node 100 from the output of the back emf amplifier circuitry 14 (see FIG. 1). The zero crossing detector circuitry 16 additionally receives a clock signal input on node 101. The final input to the zero crossing detector circuitry 16 is a signal that is generated to indicate the anticipated slope of the next forthcoming zero crossing, which is presented on node 102 connected to the output of the sequence decode and anticipated slope generator circuitry 25.

The zero crossing detector circuitry 16 includes three D-type flip-flops 105, 106, and 107. The D-type flip-flops 105–107 are connected to produce two output pulses when the back emf amplifier 14 produces an output signal that indicates that a zero crossing has actually occurred in the selected floating coil of the motor. The two pulses are connected to the reset and load terminals of the various counters of the delay circuitry 17, as shown in FIG. 1, that operate as described in the above referenced copending patent application Ser. No. 770,577.

To accomplish the load and reset pulses, the D-type flip-flops 105–107 are connected to receive the signal output from the back emf amplifier on node 100. This signal is delivered to the D input of the first D-type flip-flop 105; the Q output of the D-type flip-flop 105 is connected to the D input of the second D-type flip-flop 106; and the Q output of the D-type flip-flop 106 is connected to the D input of the third D-type flip-flop 107. The clock pulses that appear on the input node 101 are inverted by an invertor 110 and applied to the clock input of all three D-type flip-flops 105–107.

The output from the flip-flop circuitry is connected to logic circuitry 112 that includes four NAND gates 113–116. The clock pulses appearing on the input node 101 are connected to an input of each of the NAND gates 113–116 to provide timing synchronism in the operation of the logic gate circuitry 112. The NAND gate 113 receives an input from the Q output of the first D-type flip-flop 105 and from the Q(bar) output of the second D-type flip-flop 106. The NAND gate 114 receives an input from the Q output of the D-type flip-flop 106 and from the Q(bar) output of the D-type flip-flop 107. On the other hand, NAND gate 115 receives an input from the Q(bar) output of the D-type flip-flop 106 and receives an input from the Q output of the third D-type flip-flop 107. The NAND gate 116 receives an input from the Q(bar) output of the first D-type flip-flop 105 and receives an input from the Q(bar) output of the second D-type flip-flop 106.

The outputs of the NAND gate logic circuitry 112 is inverted by inverters, as shown, and directed to a second logic circuit 120 that also includes four NAND gates 121–124. In addition, the anticipated zero crossing direction signal applied to input node 102 is applied to the inputs of the NAND gates 123 and 124. The anticipated zero crossing direction signal on the input node 102 also is inverted by an invertor 127 and applied to the inputs of NAND gates 121 and 122.

The outputs from the NAND gates 121–124 represent the load and reset pulses to be applied to the delay circuitry 17 in either the positive or negative directions. More particularly, the output of NAND gate 121 is the first pulse produced in response to a positive going zero crossing; the output of NAND gate 122 is the second pulse produced in response to a positive going zero crossing. On the other hand, the output of NAND gate 124 is the first pulse produced in response to a negative going zero crossing and the output of NAND gate 123 is the second pulse produced in response to a negative going zero crossing.

The slope signal that is presented to the input node 102 is generated directly from the sequencer signals produced by the sequencer circuitry 13. As shown, the circuitry receives input signals from the upper and lower drive circuitry that is applied to the power stage 11 for application to the field coils of the motor. Depending upon the combination of signals applied to the sequence decode and anticipated slope generator circuitry 25, the output includes a signal indicating whether the anticipated or desired zero crossing direction is of positive or negative slope. The anticipated slope signal is applied to activate the respective NAND gates 121 and 122, or NAND gates 123 and 124, as described above.

So long as the slope of the anticipated zero crossing corresponds to the desired zero crossing direction required for proper rotor rotation, the signals on the output lines from NAND gates 121–124 will be properly produced. However, if a reverse rotation occurs, the signals produced at the output of the zero crossing detector 16 will not correspond with those required, as determined by the signal on the slope signal node 102. This condition is detected by the reverse rotation detector circuitry 30.

The reverse rotation detector circuitry 30 includes first and second NAND gates 130 and 131 connected at one input to respectively receive the inverted and noninverted slope signal that is applied to the input node 102. The other input of the NAND gate 130 is the inverted signal that appears at the output of NAND gate 116. Likewise, the other signal of the NAND gate 131 is the inverted output appearing at the output of NAND gate 113. The outputs of the NAND gates 130 and 131 are combined in a NAND gate 133, which produces an output indicating a warning of a reverse rotor spin. The signal produced at the output of the NAND gate 133 can be used to start or restart a motor starting algorithm, produce a brake and warn signal, or may be used in other desired ways, depending upon the particular application in which the circuitry is employed.

Although the invention has been described and illustrated with a certain degree of particularity, it is understood that the present disclosure has been made by way of example only, and that numerous changes in the combination and arrangements of parts and features can be made by those skilled in the art without departing from the spirit and scope of the invention, as hereinafter claimed.

We claim:

1. A circuit for operating a polyphase dc motor having a plurality of driving coils for causing a rotor to turn when drive signals are applied to said driving coils, comprising:

circuitry commutatively applying drive signals to said plurality of driving coils for causing the rotor to turn;

circuitry for producing a warning signal if the rotor turns in an undesired direction;

circuitry for receiving the back emf of a selected one of said driving coils at a time when said driving coil is in a floating state;

circuitry for determining an anticipated direction said back emf will cross a reference voltage;

and circuitry for determining if the back emf received by said circuitry for receiving the back emf crosses a reference voltage from other than said anticipated direction to produce a signal to said circuitry for producing a warning signal.

2. A circuit for generating a reverse rotation signal in the operation of a polyphase dc motor having a plurality of driving coils, comprising:

a comparator having a first input coupled to receive the back emf of one of said driving coils when in a floating state, having a second input coupled to a reference voltage, and having an output;

circuitry for determining an anticipated direction in which said back emf will cross the reference voltage based upon a commutation sequence of the polyphase dc motor, and for producing a slope signal indicating the anticipated direction; and circuitry, having an input coupled to the output of the comparator and having an input coupled to receive the slope signal, for generating the reverse rotation signal responsive to a transition at the output of the comparator not corresponding to the anticipated direction indicated by the slope signal.

3. The circuit of claim 2 wherein said comparator circuit receives the back emf at a time prior to commutation of the one of said driving coils.

4. The circuit of claim 3 wherein said circuitry for determining an anticipated direction detects whether said reference voltage crossing occurs with negative or positive slope.

5. The circuit of claim 3 wherein said polyphase dc motor is a brushless sensorless 3 phase dc motor.

6. The circuit of claim 3 further comprising circuitry for providing a reference crossing signal responsive to the back emf crossing the reference voltage;

and wherein said circuitry for generating the reverse rotation signal comprises:

a pair of logic gates having inputs receiving the anticipated slope direction and reference voltage crossing indicating signals.

7. The circuit of claim 3 further comprising circuitry for selecting among various ones of said driving coils as said driving signals are switched to a floating state in accordance with the commutative sequence.

8. A circuit for operating a polyphase dc motor having a plurality of driving coils, comprising:

a driver for applying drive signals to said driving coils;

an incrementable sequencer for controlling said driver to apply said drive signals in a commutative sequence to said driving coils in which at least one of said coils is selected to float without drive signals during a portion of said commutative sequence;

a back emf amplifier for amplifying the back emf on said selected at least one floating coil;

circuitry for determining an anticipated direction the back emf on said selected at least one floating coil will cross a reference voltage;

a reference voltage crossing detector for determining when the back emf on said selected at least one floating coil crosses the reference voltage from the anticipated direction;

a synchronizing circuit to determine which of said plurality of coils should be said at least one floating coil and to connect said determined coil to said back emf amplifier;

circuitry responsive to said reference voltage crossing detector to increment said sequencer in said commutative sequence;

and circuitry responsive to said reference voltage crossing detector for producing a signal when said back emf of said selected at least one floating coil crosses the reference voltage in a direction other than the anticipated direction.

9. The circuit of claim 8 wherein said circuitry for determining an anticipated direction the back emf on said selected at least one floating coil will cross a reference voltage comprises circuitry to detect whether said reference voltage crossing occurs with negative or positive slope.

10. The circuit of claim 8 wherein said circuit for operating a polyphase dc motor is a circuit for operating a brushless sensorless 3 phase dc motor.

11. The circuit of claim 8 wherein said circuitry for determining if the back emf received by said circuitry for receiving the back emf crosses a reference voltage from other than said anticipated direction comprises a pair of NAND gates having inputs receiving inverted anticipated slope direction and zero crossing indicating signals.

12. A method for operating a polyphase dc motor having a plurality of driving coils and having a rotor, comprising the steps of:

determining the actual instantaneous position of the rotor of the motor by comparing the back emf of a coil to a reference voltage at a time when the coil is in a floating state and by detecting the direction in which the back emf of the coil crosses the reference voltage;

generating a reference voltage crossing direction signal indicating the direction in which the back emf crosses the reference voltage;

determining a desired rotor position precedent to executing a desired commutation sequence by generating an anticipated slope direction signal indicating the direction in which the back emf is anticipated to cross the reference voltage in the desired commutation sequence;

executing said desired commutation sequence responsive to the actual instantaneous position of the rotor corresponding to the desired rotor position;

comparing the signal indicating the anticipated slope direction signal to the reference voltage crossing direction signal; and generating a reverse rotation signal responsive to the anticipated slope direction signal not matching the reference voltage crossing direction signal.

13. A method for operating a polyphase dc motor having a plurality of driving coils, comprising:

applying drive signals to said driving coils in a commutative sequence in which at least one of said coils is selected to float without drive signals during a portion of said commutative sequence;

amplifying a back emf signal on said selected at least one floating coil;

determining an anticipated direction that the back emf on said selected at least one floating coil will cross a reference voltage to provide an anticipated slope direction indicating signal;

determining when the back emf on said selected at least one floating coil crosses the reference voltage to provide a reference voltage crossing indicating signal;

and producing a signal when said back emf of said selected at least one floating coil crosses the reference voltage in a direction other than the anticipated direction.

14. The method of claim 13 wherein said step of determining when the back emf on said selected at least one floating coil crosses the reference voltage comprises determining whether said reference voltage crossing occurs with negative or positive slope.

15. The method of claim 13 wherein said step of determining if the back emf received by said circuitry for receiving the back emf crosses a reference voltage from other than said anticipated direction comprises comparing the anticipated slope direction and reference voltage crossing indicating signals.

* * * * *